United States Patent
White et al.

(10) Patent No.: US 6,441,681 B1
(45) Date of Patent: Aug. 27, 2002

(54) METHOD FOR PRESERVING CHARGES ON A CAP AT THE OUTPUT OF A REGULATOR

(75) Inventors: Bertram J. White; Tanchu Shih, both of Irvine, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/876,449

(22) Filed: Jun. 7, 2001

(51) Int. Cl.[7] .................................................. G05F 3/02
(52) U.S. Cl. ...................................... 327/545; 327/198
(58) Field of Search .................................. 327/143, 198, 327/545, 546

(56) References Cited

U.S. PATENT DOCUMENTS

| | | | | |
|---|---|---|---|---|
| 4,096,560 A | * | 6/1978 | Footh | 365/228 |
| 4,902,910 A | * | 2/1990 | Hsieh | 327/143 |
| 5,347,170 A | * | 9/1994 | Hayakawa et al. | 327/530 |
| 5,508,874 A | | 4/1996 | Williams et al. | |
| 5,519,346 A | * | 5/1996 | Haddad et al. | 327/143 |
| 5,521,476 A | * | 5/1996 | Bartlett | 318/466 |
| 5,587,684 A | * | 12/1996 | Salcedo | 327/143 |
| 5,841,724 A | * | 11/1998 | Ebel et al. | 327/538 |
| 6,016,234 A | | 1/2000 | Blank et al. | |
| 6,025,968 A | | 2/2000 | Albrecht | |
| 6,342,802 B1 | * | 1/2002 | Forehand | 327/143 |

* cited by examiner

*Primary Examiner*—Terry D. Cunningham
(74) *Attorney, Agent, or Firm*—W. Daniel Swayze, Jr.; W. James Brady; Frederick J. Telecky, Jr.

(57) ABSTRACT

The present invention includes a circuit to maintain a constant voltage on a storage element such as a capacitor at the output of a regulator during an emergency power condition. It includes a detector to detect the emergency condition and to generate a fault signal in response to the emergency condition, a one-shot time delay circuit to delay the enabling of a regulator in response to the fault signal, and a second delay unit to delay the enabling of the load of a regulator to accommodate the non-zero recovery time of a regulator. These two time delay units are able to bypass the noisy switching on the fault signal so that the maintained voltage on the storage capacitor will not droop and can be reliably used for such purposes as head retract and spindle brake under a noisy power emergency situation.

9 Claims, 7 Drawing Sheets

METHOD FOR PRESERVING CHARGES ON A CAP AT THE OUTPUT OF A REGULATOR

FIELD OF THE INVENTION

The present invention relates to a circuit to disconnect a load and to preserve charge on a capacitor under emergency conditions and, more particularly, to a circuit to provide power during head retract and spindle motor brake in a hard disk drive memory system.

DESCRIPTION OF THE PRIOR ART

Moving media hard disk drive (HDD) memories are commonly used in computers and portable electronic systems whenever substantial amounts of memory storage are required. In moving media hard disk drive memories, the motion of the spinning disks suspends a magnetic read/write head above the media to facilitate the motion of the head across the disk. A voice coil motor or head actuator is then used to position the head above a particular data sector and track. When the battery or power supply fails or is unexpectedly disconnected, an emergency condition or a power-down procedure including retracting the read/write head to areas free from encoded data and/or braking of the spindle motor must be performed. The positioning of the head into a safe area is known as a head retract. The braking of a spindle motor is known as a spindle brake.

If the head retract is not completed before the head crashes onto the disk, permanent loss of data and damage to the disk may result. In order to prevent such damaging head crash, the head retract circuit must be able to provide reliably an auxiliary gate drive to the power transistor devices during retract even if the power supplies are failing completely.

Figure 1:
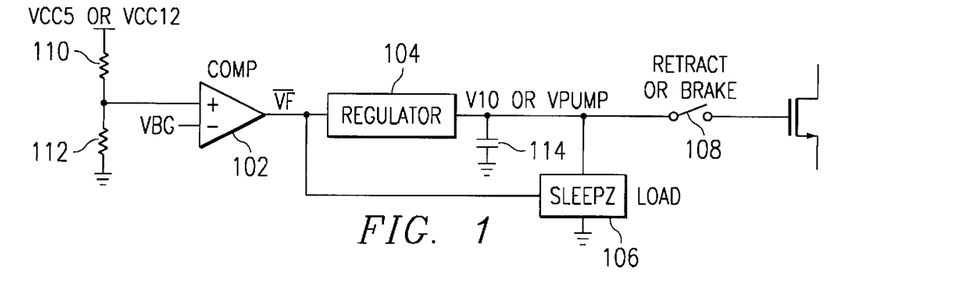
FIG. 1 illustrates a circuit diagram of the prior art of using a capacitor voltage for retract and brake under power fault condition.
Figure 2:
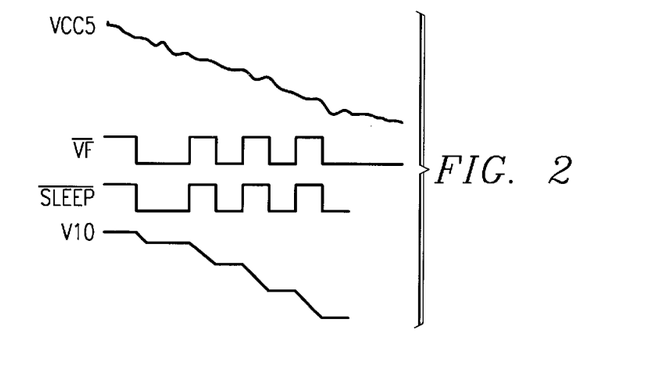
FIG. 2 illustrates a waveform diagram of a set of voltages associated with FIG. 1 showing the drooping of the capacitor voltage due to noise.
Figure 3:
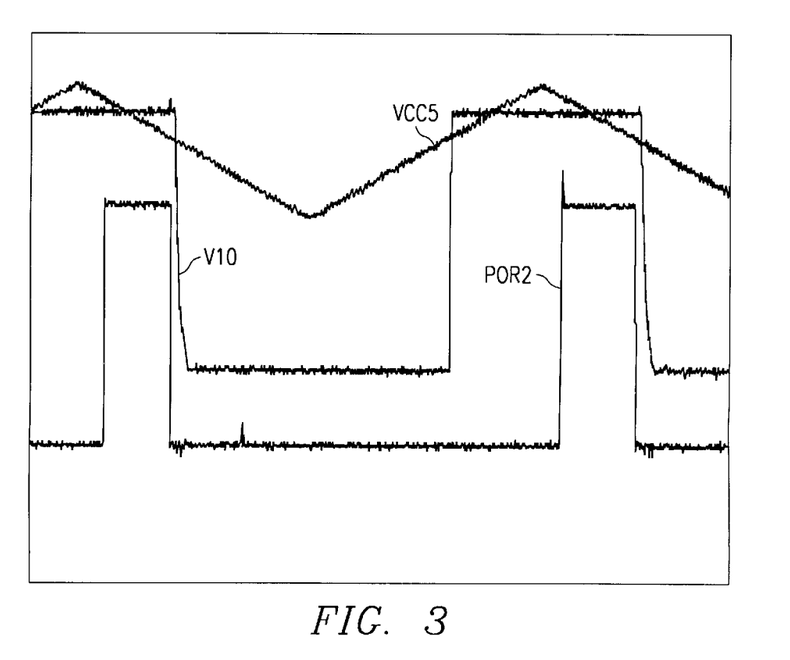
FIG. 3 illustrates a waveform diagram of the voltages associated with FIG. 1 circuit implemented showing the drooping of capacitor voltage at V10.

FIG. 1 illustrates one such circuit to maintain a voltage on a capacitor in the event of an emergency condition to be used to retract the arm and/or to brake the motor. The maintained capacitor voltage is used for providing gate drive to the power transistor devices during retract and/or brake. In FIG. 1, the voltage on capacitor 114 decays such as illustrated in FIG. 2 as a result of a noisy switching on and off of the regulator 104 and the activation and deactivation of the sleep circuit 106 which turns on and off the load. As illustrated in FIG. 1, the ENABLE input to the regulator 104 is illustrated as the output voltage VFAULTZ of a power supply monitoring comparator 102, where Z at the end of a signal name by the convention used in this description means the logical complement, i.e., VFAULTZ is the complement of VFAULT. This voltage is a series of pulses which activate and deactivate regulator 104 and load 106 under a noisy situation. Normally, once a regulator is disabled completely, it takes time to recover. It can be seen from a linear regulator schematic shown in FIG. 8 that the base node 802 of the output stage NPN transistor in the regulator takes time to slew up to a certain voltage level to turn on the NPN after the node 802 has been pulled low completely. In the meantime, the load would be turned on relatively quickly. If the VFAULTZ pulses are short, then the consequence is that each turn on is not long enough for the regulator to recover, and thus the load would drain a certain amount of charge from the capacitor 114 each time. So the voltage at node V10 (and VPUMP) would droop, as shown in FIG. 2. But this drooping of the voltage at V10 and VPUMP is not desirable, because the voltage at the capacitor is needed for driving the gates of the power transistor devices for head retract and spindle brake. FIG. 3 is an oscilloscope picture with implementation as shown in FIG. 1 showing the drooping of V10 voltage occurring under a fault on the power supply VCC5. Glitches are noise pulses which are unexpected and of short duration.

SUMMARY OF THE INVENTION

The present invention provides a method and apparatus for maintaining the voltage on a capacitor. The voltage is maintained during an emergency condition for example a voltage loss or voltage reduction. Additionally, the present invention maintains this voltage on the capacitor if there are glitches in the voltage. The present invention employs a one-shot circuit to prevent these glitches from reaching the regulator circuit and consequently from preventing the capacitor from discharging due to excess on and off operation of the regulator circuit. Thus, the present invention uses a one-shot device to prevent capacitor droop when the voltage as a result the emergency condition causes multiple trips due to circuit and system noise.

DETAILED DESCRIPTION OF THE PRESENT INVENTION

The following invention is described with reference to figures in which similar or the same numbers represent the similar or same elements. While the invention is described in terms for achieving the invention's objectives, it can be appreciated by those skilled in the art that variations may be accomplished in view of these teachings without deviation from the spirit or scope of the invention.

Figure 13:
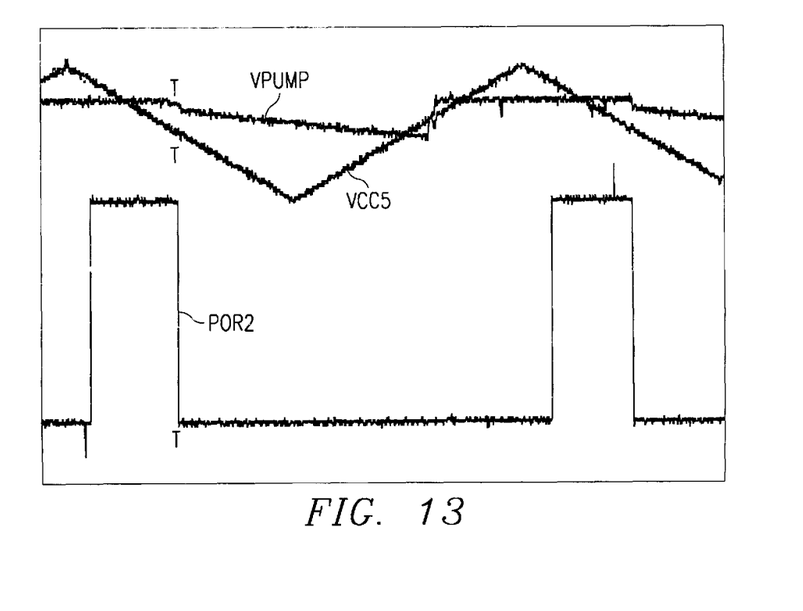
FIG. 13 illustrates a side view of a disk drive.

FIG. 13 shows a side and top view, respectively, of the disk drive system designated by the general reference 1100 within an enclosure 1110. The disk drive system 1100 includes a plurality of stacked magnetic recording disks 1112 mounted to a spindle 1114. The disks 1112 may be conventional articulate or thin film recording disk or, in other embodiments, they may be liquid-bearing disks. The spindle 1114 is attached to a spindle motor 1116 which rotates the spindle 1114 and disks 1112. A chassis 1120 is connected to the enclosure 1110, providing stable mechanical support for the disk drive system. The spindle motor 1116 and the actuator shaft 1130 are attached to the chassis 1120. A hub assembly 1132 rotates about the actuator shaft 1130 and supports a plurality of actuator arms 1134. The stack of actuator arms 1134 is sometimes referred to as a "comb." A rotary voice coil motor 1140 is attached to chassis 1120 and to a rear portion of the actuator arms 1134.

A plurality of head suspension assemblies 1150 are attached to the actuator arms 1134. A plurality of inductive transducer heads 1152 are attached respectively to the suspension assemblies 1150, each head 1152 including at least one inductive write element. In addition thereto, each head 1152 may also include an inductive read element or a MR (magneto-resistive) read element. The heads 1152 are positioned proximate to the disks 1112 by the suspension assemblies 1150 so that during operation, the heads are in electromagnetic communication with the disks 1112. The rotary voice coil motor 1140 rotates the actuator arms 1134 about the actuator shaft 1130 in order to move the head suspension assemblies 1150 to the desired radial position on disks 1112.

A controller unit 1160 provides overall control to the disk drive system 1100, including rotation control of the disks 1112 and position control of the heads 1152 and includes the spindle and actuator control/driver of the present invention. The controller unit 1160 typically includes (not shown) a central processing unit (CPU), a memory unit and other digital circuitry, although it should be apparent that these aspects could also be enabled as hardware logic by one skilled in the computer arts. Controller unit 1160 is connected to the actuator control/drive unit 1166 which is in turn connected to the rotary voice coil motor 1140. A host system 1180, typically a computer system or personal computer (PC), is connected to the controller unit 1160. The host system 1180 may send digital data to the controller unit 1160 to be stored on the disks, or it may request that digital data at a specified location be read from the disks 1112 and sent back to the host system 1180. A read/write channel 1190 is coupled to receive and condition read and write signals generated by the controller unit 1160 and communicate them to an arm electronics (AE) unit shown generally at 1192 through a cut-away portion of the voice coil motor 1140. The AE unit 1192 includes a printed circuit board 1193, or a flexible carrier, 1134 or in close proximity thereto, and an AE module 1194 mounted on the printed circuit board 1193 or carrier that comprises circuitry preferably implemented in an integrated circuit (IC) chip including read drivers, write drivers, and associated control circuitry. The AE module 1194 is coupled via connections in the printed circuit board to the read/write channel 1190 and also to each read head and each write head in the plurality of heads 1152.

While the present invention describes a power fault condition, the principles of the present invention is applicable to all emergency conditions.

Figure 4:
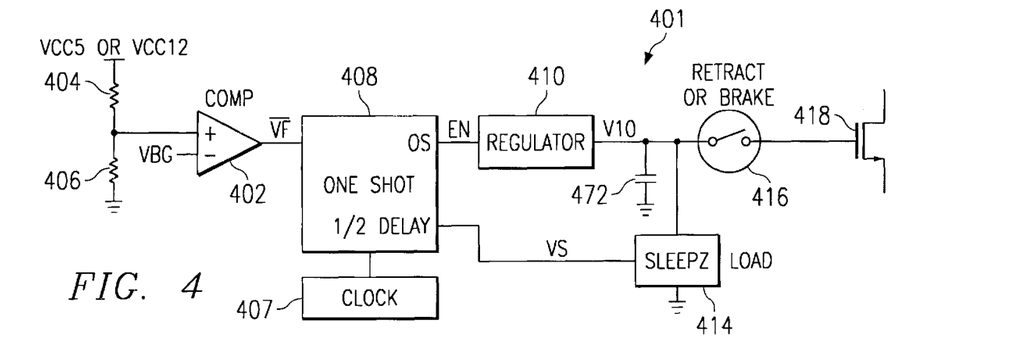
FIG. 4 illustrates a circuit diagram of the present invention.

As illustrated in FIG. 4, one end of resistor 404 is connected to voltage Vcc which could be 5 volts or 12 volts. The other end of resistor 404 is connected to resistor 406. The other end of resistor 406 is connected to ground. Resistors 404 and 406 form a voltage divider to reduce the voltage VCC in accordance with the ratio values of the resistance of resistors 404 and 406. The voltage is reduced, a reduced voltage, to be on the order of the band gap voltage VBG so that a reduction in the voltage VCC when reduced is less than the band gap voltage. The plus input of comparator 402 is connected between one end of resistor 404 and the other end of resistor 406. The minus input of comparator 402 is connected to band gap voltage, VBG. The comparator 402 compares the reduced voltage and the band gap voltage, and when the reduced voltage is below the band gap voltage VBG, the comparator 402 operating as a detector outputs a fault voltage, VFAULTZ signals to indicate an emergency condition. The output of comparator 402 is connected to a one-shot circuit 408. When the fault voltage, VFAULTZ signal, goes low in response to a power supply fault condition, a head retract operation is initiated represented symbolically by the control switch 416. During a head retract or a spindle brake, the gate of the power FET 418 is driven by the maintained voltage on capacitor 412. The output fault voltage, VFAULTZ signal, of the comparator 402 is connected to the input signal, CLEARZ signal, of a one-shot delay circuit 408. Whenever the voltage fault signal, VFAULTZ signal, goes to 0, the outputs, ONESHOT signal, and +HALF_CYCLE signal which is a half cycle of the clock but other short delays are acceptable, and the internal count of the one-shot circuit 408 are cleared to 0 to shut off the regulator 410 and disconnects the load 414. When the power fault condition no longer exists, the comparator output, VFAULTZ signal, goes to 1, and the one-shot circuit 408 starts to count from 0 up to a predetermined count corresponding to a period of delay time related to the clock signal 407. If no power fault occurs before this predetermined count is reached, then this is the end of this delay period, the output, ONESHOT signal, of the one-shot circuit 408 goes to 1, which enables the regulator 410. Moreover, if there is no fault occurring during the next half cycle of the one shot circuit 408, then at the end of this half cycle, the output, +HALF_CYCLE signal, of the one-shot unit 408 goes to 1 too, which enables the load 414. If another power fault or emergency condition occurs before the count is reached or during the half cycle, then the one-shot circuit 408 is reset to 0 by the CLEARZ signal again, and the above described process is repeated.

Figure 5:
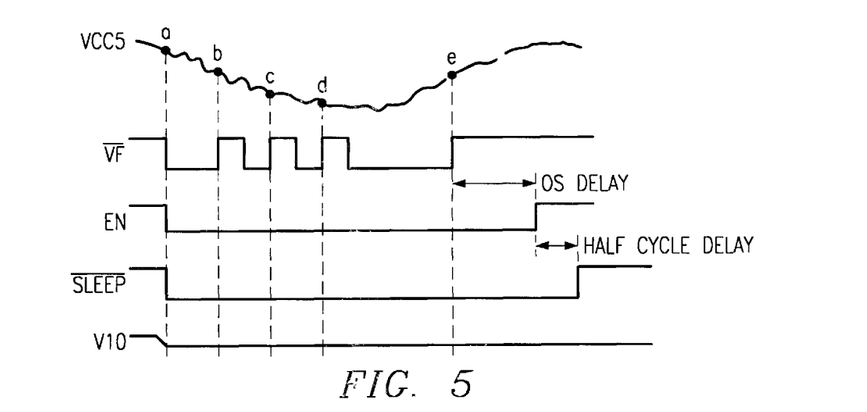
FIG. 5 illustrates a waveform diagram showing reduced drooping of the capacitor voltage under noise for circuit associated with FIG. 4.

FIG. 5 illustrates the voltage Vcc, the fault voltage, VFAULTZ signal, the one-shot voltage namely the input regulator, ENABLE signal, the load control voltage, SLEEPZ signal, and the capacitor voltage namely V10 or VPUMP. Additionally, various time points are illustrated namely as t1, t2, t3, and etc. The waveforms in FIG. 5 are associated with the circuit block diagram in FIG. 4 for the present invention. At time t1, an emergency condition represented as a power fault has occurred and the output, VFAULTZ signal, of the comparator 402 goes to 0. A short time later due to delay in the transmission of the signal, the ENABLE signal of the regulator 410 goes to 0 and the regulator 410 is disabled. FIG. 5 shows the case in which the delay between the output, VFAULTZ signal, of the capacitor 402 to SLEEPZ signal output from one shot circuit 408 to the load circuit 414 is slightly longer than the delay between VFAULTZ signal to ENABLE output from the one shot circuit 408 to the regulator circuit 410 and so that the SLEEPZ of the load 414 goes to 0 at time t3. Thus the load 414 is shut off later and consequently the capacitor voltage at V10 (or VPUMP) drops slightly as shown between time t2 and t3. At time t4, the emergency condition has ended so VFAULZ signal goes to 1, and the one-shot circuit 408 starts to count up from 0. But before the predetermined count is reached, i.e., before the delay of the one-shot is ended, another or several emergency conditions has occurred so the VFAULTZ signal goes to 0 again at time t5. Thus the ENABLE signal and SLEEPZ signal stay at 0 during the short time interval between t4 and t5 even though there is no emergency condition present during this short time interval between t4 and t5. Consequently, capacitor 412 does not discharge and the voltage at V10 (or VPUMP) does not droop in contrast with the case of the prior art shown in FIG. 2. Similarly, the two short glitches of VFAULTZ signal between t6 and t9 are ignored by the one-shot delay. At time t10, the emergency condition ends and VFAULTZ signal goes to 1 again. The one-shot circuit 408 starts to count up for the one-shot delay. When the one-shot delay expires at time t11, and no emergency condition has occurred since time t10. Thus the ENABLE signal goes to 1 to enable the regulator 410 at time t11. The short time interval between t11 and t12, a recovery time, allows time for the regulator 410 to recover. For example, for the schematic of the regulator 410 shown in FIG. 8, this recovery time is basically the time for the base node of the output of NPN transistor 802 to slew up to a predetermined voltage level, for example, a diode voltage above V10 to turn on the NPN transistor 802. After time t12, the regulator 410 is on and the voltage at V10 (or VPUMP) is lifted back to the normal voltage level between time t12 and t13. Then at time t14, the half cycle delay of one short circuit 408 expires and SLEEPZ signal goes to 1, and the load 414 is turned on. Since by this time, the regulator has already fully recovered from its disabled state, there is no droop on the capacitor voltage at V10 (or VPUMP).

Figure 6:
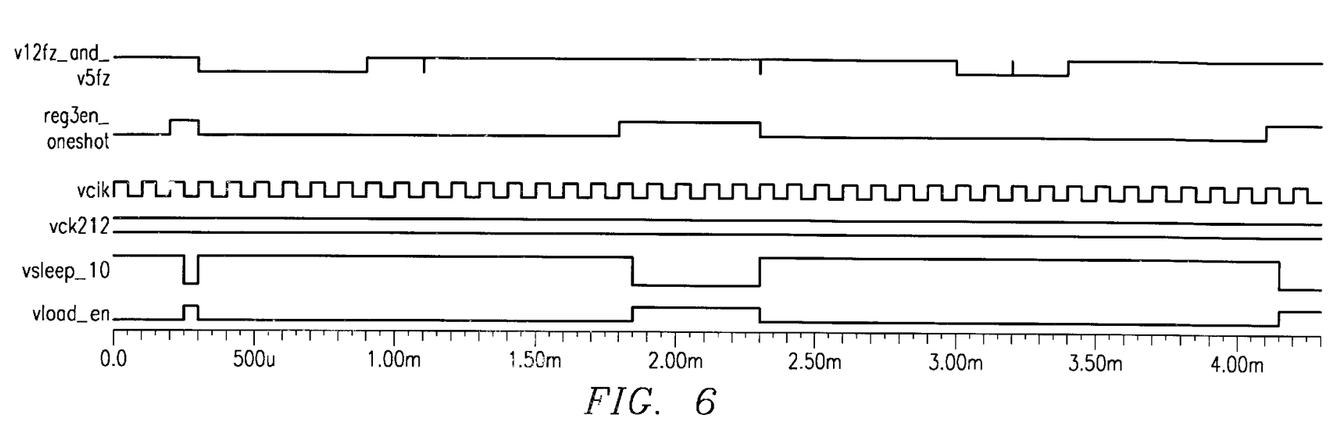
FIG. 6 illustrates a waveform diagram of the one-shot delay circuit of the present invention.

FIG. 6 illustrates a set of waveforms produced by a computer simulation, where v12fz__and__v5fz corresponds to VFAULTZ signal for 12 volts and 5 volts respectively; vclk corresponds to CLK; reg3en__oneshot corresponds to the ENABLE signal; and vload__en corresponds to SLEEPZ signal in relation to the signal names in FIG. 4. The one-shot delay and the additional half cycle delay can be seen in FIG. 6.

Figure 7:
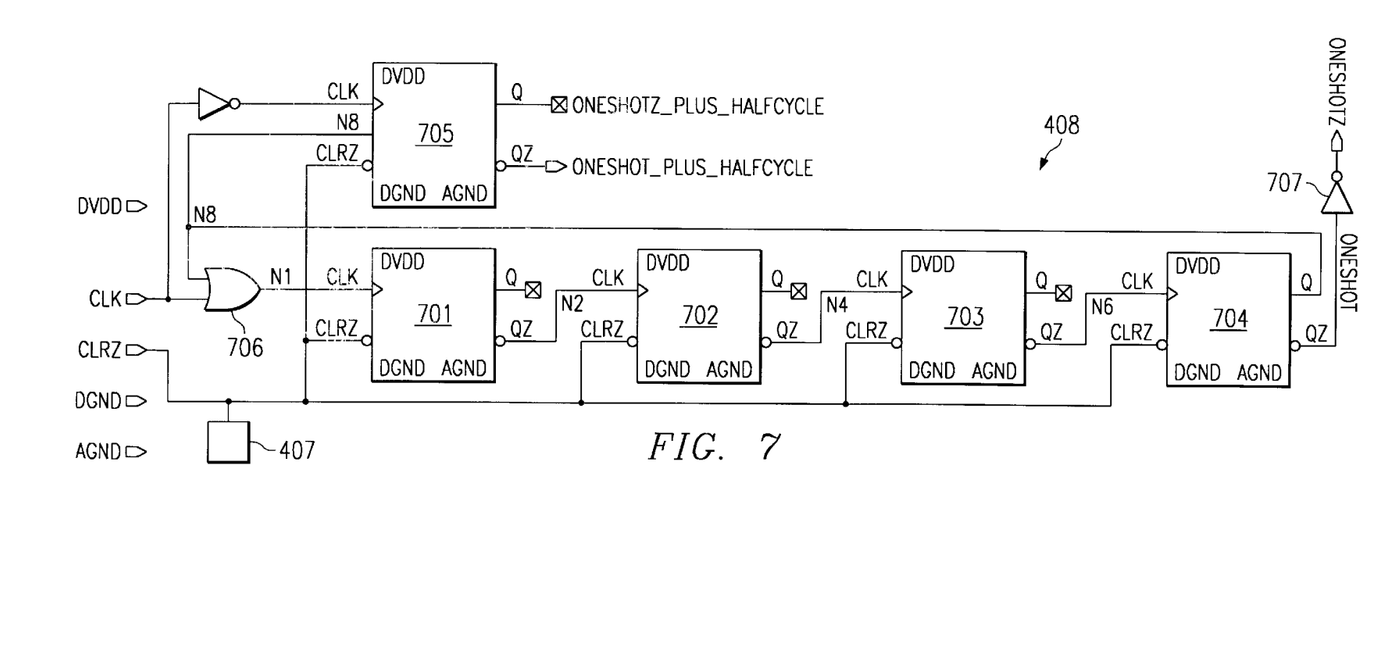
FIG. 7 illustrates a one-shot delay circuit of the present invention.

FIG. 7 illustrates a one-shot circuit 408 as illustrated in FIG. 4. The one-shot circuit 408 includes the flip-flop 701, flip-flop 702, flip-flop 703, flip-flop 704 and flip-flop 705. The QZ output of flip-flop 701 is connected to the D input of flip-flop 702. The QZ output of flip-flop 702 is connected to the D input of flip-flop 703. The QZ output of flip-flop 703 is connected to the D input of flip-flop 704. The Q output of flip-flop 704 is connected to the D input to the flip-flop 705 to achieve the delay for the load circuit 414. Additionally, the Q output from flip-flop 704 is an input to OR gate 706. The output from OR gate 706 is connected to the D input of flip-flop 701. The inverter circuit 707 inverts the QZ output of flip-flop 704. The four flip-flops 701 through 704 are arranged as a ripple counter with a common clear signal, CLRZ signal. When CLRZ signal is 0, the count formed by the Q's of the flip-flops 701 through 704 is the binary 0000. When CLRZ signal goes to 1, the ripple counter starts counting up from 0000. When the count reaches the binary 1000, the clock signal CLK is inhibited through the OR gate 706, and the counter stops counting. The duration from count 0000 to count 1000 corresponds to the one-shot delay. Moreover, the flip-flop 705 provides a half cycle delay in addition to the one-shot delay when the count is 1000.

Figure 8:
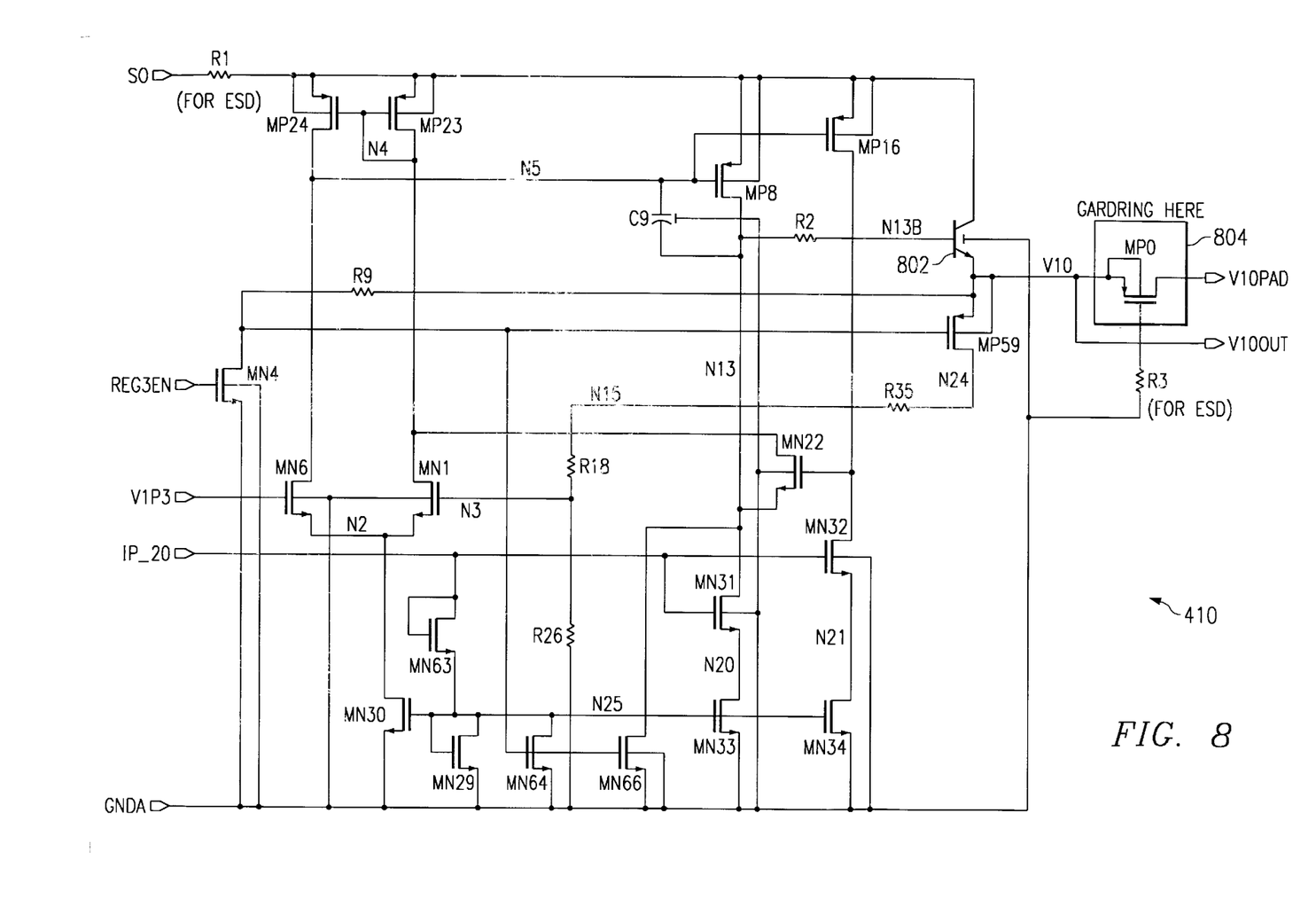
FIG. 8 illustrates a schematic of a linear regulator circuit.

FIG. 8 illustrates details of the regulator circuit 410. As illustrated in FIG. 8, the emitter of NPN transistor 802 is connected to the output voltage V10. (A latch-up protection circuit, PMOS 804 is connected at the output of regulator 410 in order to provide latch-up protection.) Note that the base node 802 is pulled down when the regulator is disabled. When the regulator is enabled, this base node 802 slews up to a voltage Vbe above the regulated voltage at the output where the external capacitor 412 is connected.

Figure 9:
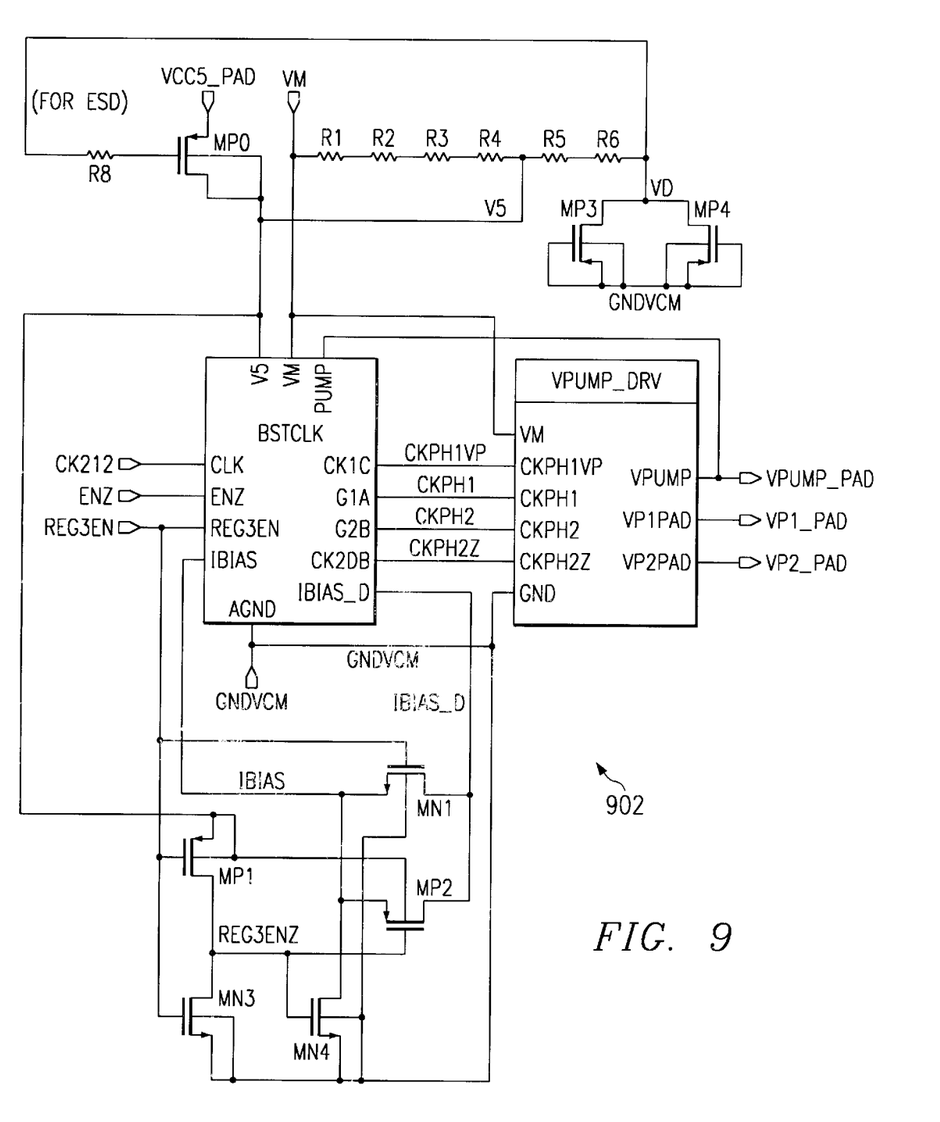
FIG. 9 illustrates a top level schematic of a charge pump regulator circuit.

FIG. 9 illustrates a charge pump circuit 902 which could be used instead of regulator circuit 410. In this case, it is also enabled by the ENABLE signal and the output of the charge pump circuit 902 would be the voltage VPUMP. The charge pump circuit 902 includes a non-overlapping clock generator and an output driver. Similar in operation to the regulator circuit shown in FIG. 8, once the charge pump circuit 902 is disabled completely, it takes time to recover from the emergency condition.

Figure 10:
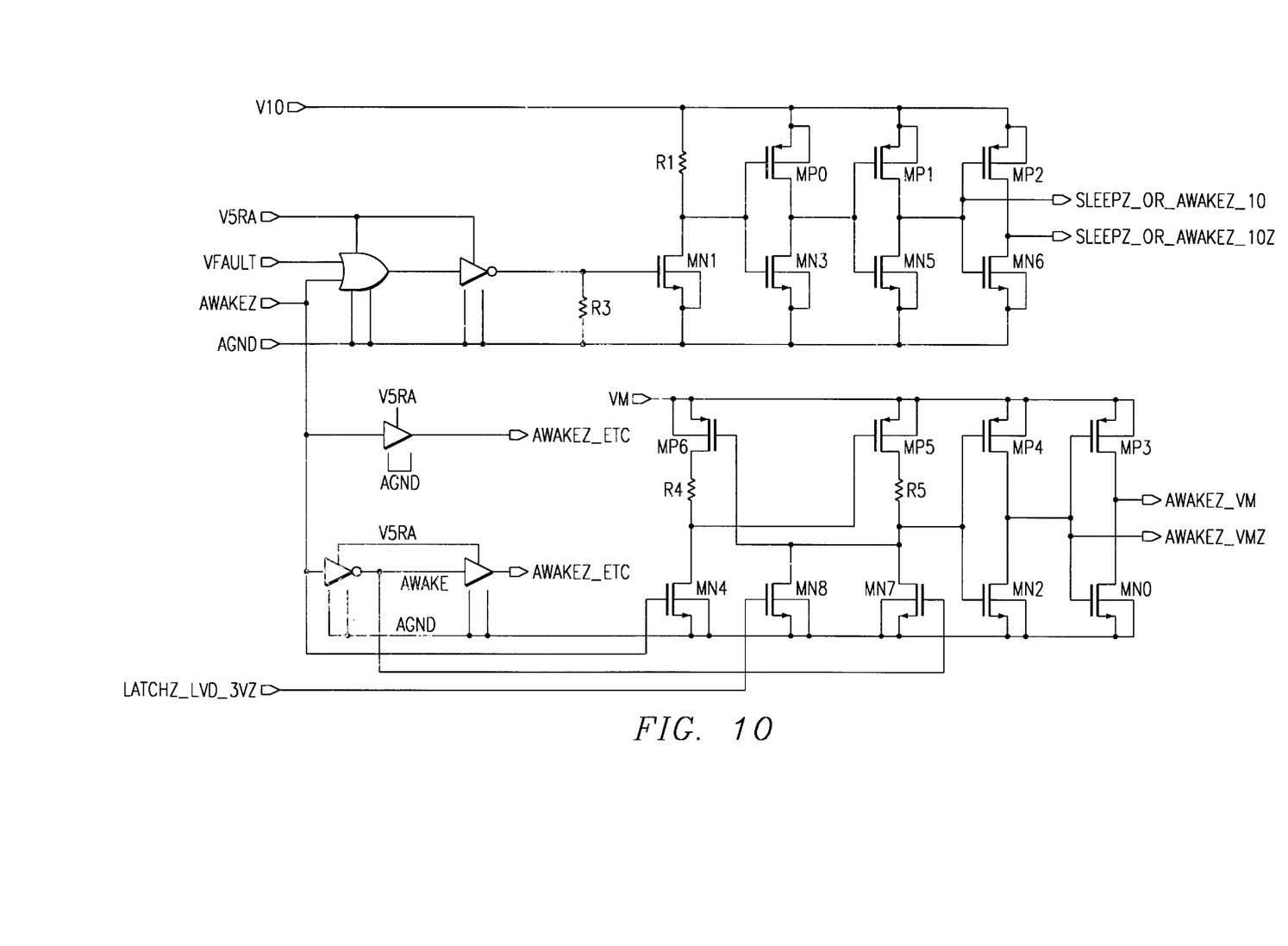
FIG. 10 illustrates a schematic of a sleep mode control circuit.

FIG. 10 illustrates a sleep mode control circuit used on a chip.

Figure 11:
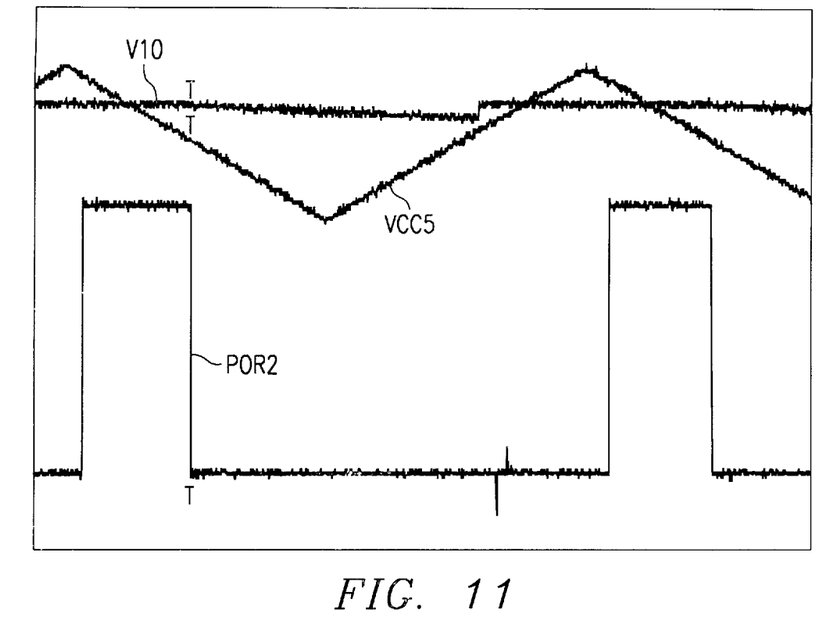
FIG. 11 illustrates a non-drooping capacitor voltage at V10 under emergency conditions of the present invention

FIG. 11 illustrates waveforms with present invention implemented. In this example, the power supply voltage VCC5 is ramping down to produce an emergency condition and then ramping up to exit the emergency condition. The waveforms are generated under the same test condition used in FIG. 3. It can be seen from the waveform of V10 that the voltage droop occurred in FIG. 3 is not present here in FIG. 11. Note that the slight slope on V10 is due to the leakage caused by a resistance of the measurement device. The amount of the slope is caused by the RC time constant, where C is the capacitance of the capacitor 412 in FIG. 4, and R is the resistance of this measured device.

Figure 12:
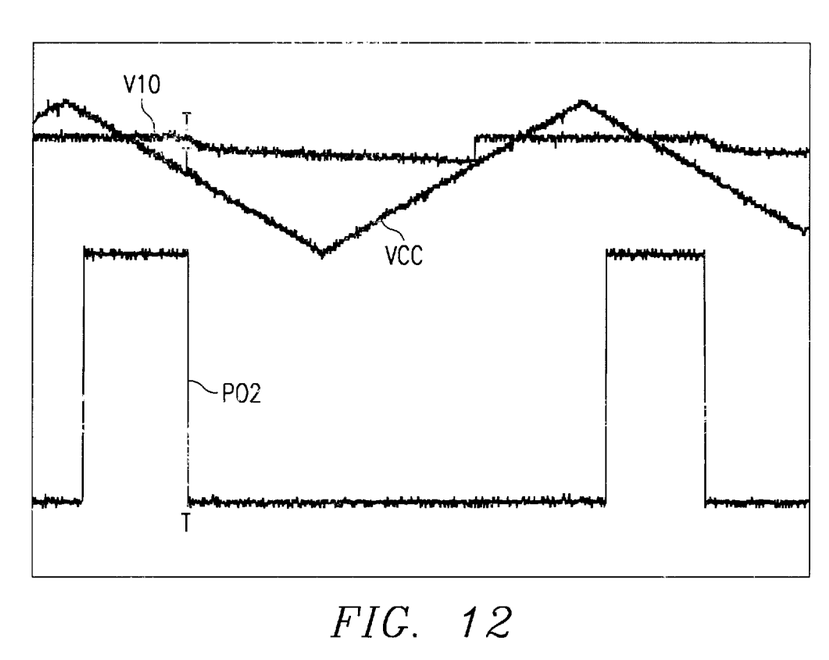
FIG. 12 illustrates a non-drooping capacitor voltage at VPUMP of the present invention.

FIG. 12 illustrates waveforms with the present invention implemented. The test condition is the same as that in FIG. 11. It can be seen that there is no voltage drooping on the VPUMP node. Similar to FIG. 11, the slight slope on VPUMP waveform is due to the RC time constant of the measurement device.

What is claimed is:

1. A circuit to maintain a constant voltage during an emergency condition; comprising:

a detector to detect said emergency condition and to generate a fault signal in response to said emergency condition;

a one-shot circuit to determine if said fault signal is not present during a predetermined period of time from when said fault signal ends and to generate a one-shot signal in response thereto;

a regulator circuit to output a regulated voltage in response to receiving said one-shot signal; and a storage circuit to store said regulated voltage for use during said emergency condition.

2. A circuit to maintain a constant voltage during an emergency condition as in claim 1 wherein said regulator circuit is a charge pump circuit.

3. A circuit to maintain a constant voltage during an emergency condition as in claim 1 wherein said storage circuit is a capacitor.

4. A circuit to maintain a constant voltage during an emergency condition as in claim 1 wherein said emergency detector is a comparator.

5. A circuit to maintain a constant voltage during an emergency condition as in claim 1, said circuit to maintain a constant voltage, further comprising:

a load circuit which is enabled after a second predetermined delay from when the one shot signal is generated.

6. A method of maintaining a constant voltage during an emergency condition; comprising:

detecting said emergency condition and to generate a fault signal in response to said emergency condition;

delaying to determine if said fault signal is not present during a predetermined period of time from when said fault signal ends and to generate a one-shot signal in response thereto;

regulating a regulated voltage in response to receiving said one-shot signal; and storing said regulated voltage for use during said emergency condition.

7. A method of maintaining a constant voltage during an emergency condition as in claim 5 wherein said regulating step is charging a charge pump.

8. A method of maintaining a constant voltage during an emergency condition as in claim 5 wherein said storing step is charging up a capacitor.

9. A method of maintaining a constant voltage during an emergency condition as in claim 5 wherein said detecting step includes the step of comparing a voltage with a reference voltage.

* * * * *